June 6, 1967  J. O. HRUBY, JR  3,323,725
POP-UP LAWN SPINKLER WITH REGULATING VALVE
Filed Feb. 1, 1965  3 Sheets-Sheet 1
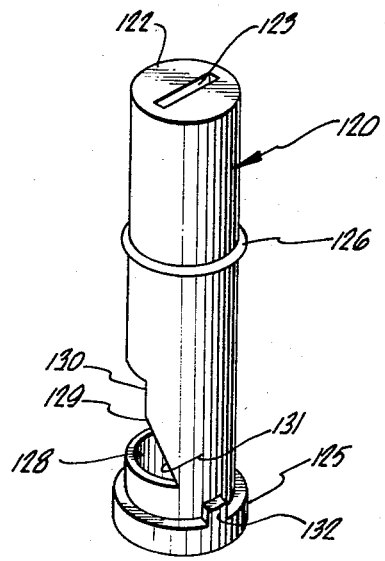
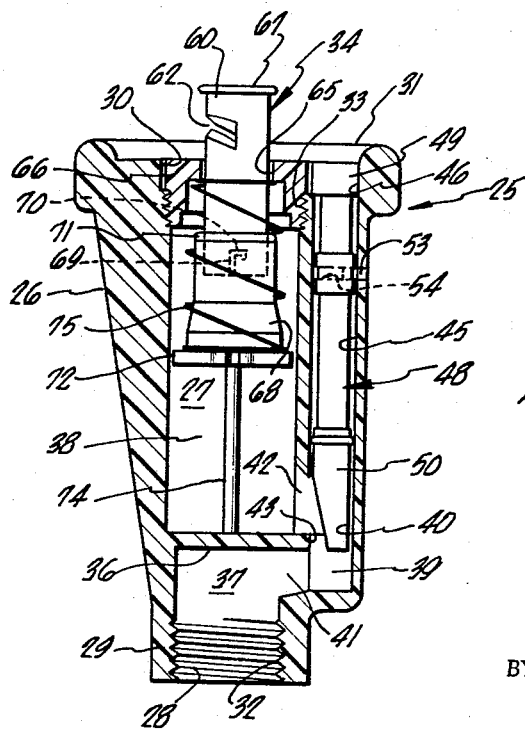
INVENTOR.
JOHN O. HRUBY, JR.
BY
Christie, Parker & Hale
ATTORNEYS.

June 6, 1967    J. O. HRUBY, JR    3,323,725
POP-UP LAWN SPINKLER WITH REGULATING VALVE
Filed Feb. 1, 1965    3 Sheets-Sheet 2

INVENTOR.
JOHN O. HRUBY, Jr.
BY
Christie, Parker & Hale
ATTORNEYS

United States Patent Office 3,323,725
Patented June 6, 1967

3,323,725
POP-UP LAWN SPRINKLER WITH REGULATING
VALVE
John O. Hruby, Jr., Burbank, Calif., assignor to Rain Jet
Corporation, Burbank, Calif., a corporation of California
Filed Feb. 1, 1965, Ser. No. 429,503
14 Claims. (Cl. 239—205)

This invention relates to water distribution, and more particularly, to apparatus for watering lawns and the like wherein a plurality of sprinkler heads are mounted flush with the lawn and are connected to a buried water conduit, and wherein each head has incorporated therein a flow regulator accessible from above the ground without dismantling the head.

Built-in lawn sprinkling systems, i.e., lawn sprinkling systems wherein a water pipe is buried in the ground and is connected to a plurality of water discharge heads disposed flush with the lawn or above it, are known. The water pipe normally is valved at a location out of the area sprinkled when the system is turned on. Because the sprinkling or water discharge heads are spaced along the pipe, the pressure of the water supplied to the heads decreases, because of "head loss" in the pipe, proceeding away from the control valve. Accordingly, unless some compensation is made, the head closest to the valve will discharge a greater quantity of water per unit of time, and thereby water a greater area of lawn, than the head next to it but spaced away from the control valve. It is desirable, however, that each sprinkling head water substantially the same amount of lawn surface.

Devices according to my prior Patents 2,810,607, 2,899,978 and 2,963,264 may be used to regulate the flow through the various heads in a sprinkling system. One of these devices is located in a riser pipe connecting each head to the buried water pipe. The regulators, however, cannot be adjusted without removing the operative part of the heads disposed above them so the blade of a long-shafted screwdriver or the like can be engaged with the regulators. This means that adjustment of the entire system is a long process.

This invention provides an improved lawn sprinkling head which includes a mechanism for regulating the flow of water through the head so that a given head discharges water at the same rate as other similar heads in a lawn sprinkling system of which the given head is a component. The flow regulating apparatus has the feature that it is operable from the lawn surface. No other elements of the head need be removed to provide access to the flow regulator.

Generally speaking, this invention provides a fluid flow regulating device which includes a housing having a fluid flow passage extending between inlet and outlet ends of the passage at opposite ends of the housing. A septum is provided across the passage intermediate the ends of the passage. The septum defines an aperture therethrough for providing communication between the portions of the passage on opposite sides of the septum. A movable member is rotatably mounted in the housing and extends from adjacent the septum to an exposed end at one end of the housing. Preferably the exposed end of the movable member is disposed at the end of the housing which defines the outlet end of the passage. The movable member cooperates with the septum aperture for varying the communication between the passage portions upon angular movement of the member relative to the housing.

In a preferred embodiment of the invention, a water discharge device is mounted in the passage at the outlet end of the passage. Also, the one end of the housing is adapted to be mounted substantially flush with the surface of a lawn or the like so that water discharged from the water discharge device is sprinkled gently over the lawn.

The above-mentioned and other features of the invention are more fully set forth in the following detailed explanation of preferred embodiments of the invention, this explanation being made in conjunction with the accompanying drawing wherein:

FIG. 7 is a cross-sectional elevation view of a flow regulated head according to this invention equipped with a second preferred water discharge device;

FIG. 10 is a perspective view of the valve member in the head shown in FIGS. 8 and 9.

Figure 1:
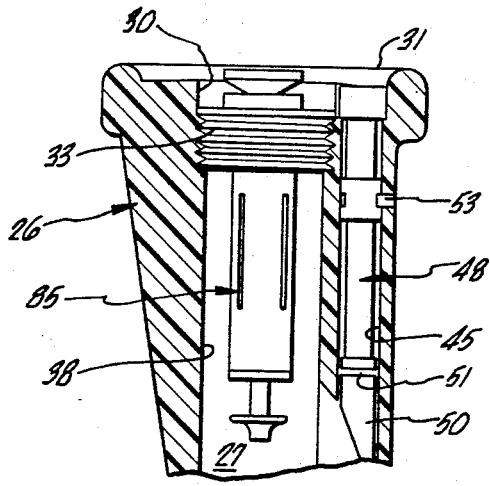
FIG. 1 is a cross-sectional elevation view of a flow regulated sprinkling head according to this invention equipped with a first preferred water discharge device.

FIG. 1 shows a sprinkling head 25 according to this invention. The head includes a housing 26 which defines a fluid flow passage 27 through the housing. The passage has an inlet end 28 at housing lower end 29 and an outlet end 30 at housing upper end 31. The circumference of the passage inlet defines an internal thread 32 whereby the housing is adapted to be connected to the externally threaded upper end of a riser duct connected to a buried water pipe. The housing defines an internal thread 33 adjacent the passage outlet. A water discharge device 34 is secured to housing 26 in the passage by means of thread 33.

A septum or wall 36 is provided across passage 27 intermediate the length of the passage. The septum is defined by the housing and divides the passage into an upstream portion 37 and a downstream portion 38. The housing also defines a by-pass duct 39 around the septum. The by-pass duct has a cylindrical portion 40 aligned parallel to the fluid flow passage. The duct has an inlet opening 41 to the passage upstream portion and an outlet opening 42 to the passage downstream portion. The duct outlet opening extends from the downstream side of the septum to a location spaced from the septum. The duct outlet opening, viewed along a line normal to the axis of duct portion 40, is substantially rectangular in shape and has a length along the axis of duct portion 40 greater than its width. The axis of duct portion 40 is spaced farther laterally of passage downstream portion 38 than the radius of duct portion 40. Preferably duct inlet opening 41 extends to the upstream side of septum 36; accordingly, the cylindrical portion of the bypass duct defines a circular aperture 43 through the septum at a location spaced laterally of passage 27.

Housing 26 defines an extension 45 of by-pass duct portion 40. The extension has an opening 46 to the exterior of the housing at the upper end of the housing adjacent the outlet opening of passage 27.

A cylindrical valve member 48 is disposed in by-pass duct extension 45 and extends from adjacent septum 36 to an exposed end 49 at the upper end of the housing. The valve member has an elongated plug-like barrel or control portion 50 having a diameter approximating the diameter of duct portion 40 and its extension. The barrel of the valve member extends from adjacent the upstream side of the septum to beyond the downstream end of bypass duct outlet opening 42. An O-ring 51 is disposed around the upper end of the barrel for sealing the valve member to the walls of the by-pass duct extension.

The upper end of the valve member defines a slot recess 52. The valve member is thus adapted to be engaged by the blade of a screwdriver or the like for rotating the valve member in the housing.

The valve member is secured from axial movement in the housing by a pin 53 disposed in the housing and projecting into by-pass duct extension 45 remote from the by-pass outlet opening. The pin is engaged in a recess 54 which extends partially around the circumference of the valve member. Recess 54 is configured relative to pin 53 to permit the valve member to be rotated through an arc of about 180°.

Figure 4:
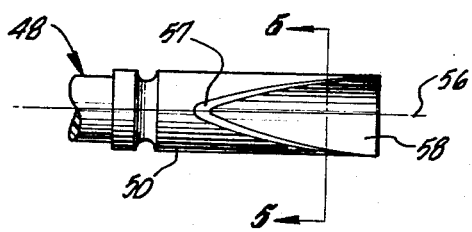
FIG. 4 is an enlarged side elevation view of the movable valve member of the head shown in FIG. 1.
Figure 5:
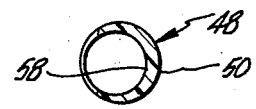
FIG. 5 is a cross-sectional elevation view taken along line 5—5 of FIG. 4.
Figure 6:
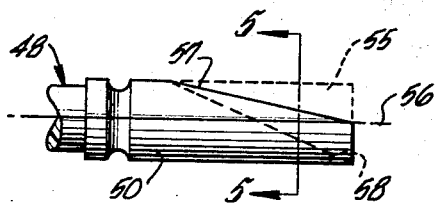
FIG. 6 is a side elevation view of the valve member shown in FIG. 4 as viewed along a line normal to that of the view of FIG. 4.

As shown in FIGS. 4, 5 and 6, the lower end of the valve member barrel is configured so that the valve member in one limit of its rotation relative to the housing closes the by-pass duct outlet opening, and so that in the other limit of its rotation relative to the housing it provides maximum communication between the by-pass duct and passage downstream portion 38. Progressively greater areas of the by-pass duct outlet opening are made available for the flow of water therethrough as the valve member is rotated from the one limit to the other. As the valve is first opened, it provides a fine adjustment over the rate of water flow through the housing since the initial exposure of opening 42 per degree of valve rotation is gradual. When the valve is in its full-open position, however, it provides a minimum pressure drop in water flowing through the housing.

As shown in FIGS. 4, 5 and 6, the barrel of the valve member has a segmentally relieved portion 55 which extends from adjacent the downstream end of by-pass outlet opening 42 to the lower end of the barrel. The amount of segmental relief of the barrel increases linearly toward the lower end of the barrel. The portion 55 of the barrel which is relieved (i.e., not present on the barrel) is that portion of the barrel which lies opposite the axis 56 of the barrel from an imaginary plane 57 which intersects the barrel at an oblique angle to the barrel axis. Preferably plane 57 intersects the axis of the barrel at the lower end of the valve member, i.e., at the lower end of the barrel. Further, the barrel adjacent the segmentally relieved portion thereof defines a semi-circularly concave surface 58 which opens toward plane 57. At the lower end of the barrel, surface 58 is substantially coextensive with the circumference of the barrel (see FIG. 6). The amount the barrel is circularly recessed below plane 57 decreases proceeding upwardly along the barrel.

Preferably slot recess 52 is aligned normal to the plane 57 of segmental relief of the barrel. Accordingly, when the valve member is disposed in one limit (a first limit) of rotation relative to the housing, one end of recess 52 is aligned with outlet 30 of fluid flow passage 27 and barrel surface 58 opens away from the passage; in such a position of the valve member, the by-pass duct is substantially closed to fluid flow therethrough. When the valve member is rotated so that the other end of slot recess 52 is disposed toward passage outlet opening 30, the valve is in its other limit (a second limit) of rotation relative to the housing and barrel surface 58 is disposed toward passage 27 and maximum fluid flow is permitted through the by-pass duct. It is thus apparent that valve member 48, septum 36 and by-pass duct 39 cooperative to provide means for regulating the flowrate of fluid through passage 27.

Figure 2:
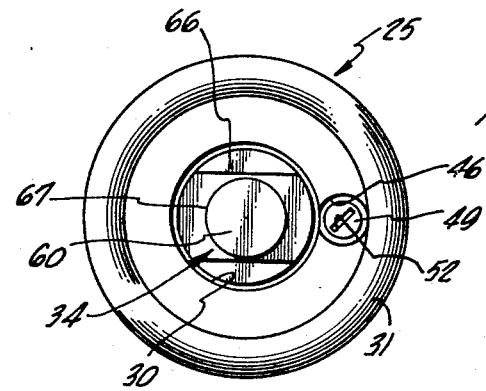
FIG. 2 is a top plan view of the apparatus shown in FIG. 1.
Figure 3:
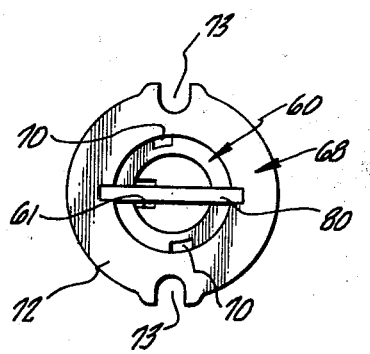
FIG. 3 is a bottom plan view of the water discharge device shown in the head illustrated in FIG. 1.

Water dispensing device 34 shown installed in housing 26 in FIG. 1, is according to my United States Patent 3,082,961, issued Mar. 26, 1963. Essentially, the device comprises a hollow body 60 having an inside chamber (not shown). The chamber has upper and lower ends. The lower end of the body has an inlet opening 61 (see FIG. 3) opening to the downstream portion of housing passage 27 eccentric of the longitudinal axis of the chamber. The body has an outlet opening 62 from the chamber larger in size than inlet opening 61. The outlet opening is spaced between the ends of the chamber. As shown in the drawings, the outlet opening extends transversely of the chamber farther than it extends along the chamber; in such a case inside surfaces of the ends of the chamber preferably are spaced from the outlet opening by a distance at least one-fourth the largest transverse diameter of the chamber. If desired, however, the outlet opening can be parallel to the axis of the chamber.

Body 60 is disposed in a central opening 65 formed through an externally threaded annular member 66. The annular member is secured to the housing by way of threads 33. The upper end of the body defines a circumferential lip 67 which has a maximum diameter greater than the diameter of opening 65. Below the annular member, the body is secured to a tubular member 68 by a bayonet coupling 69. The bayonet coupling includes a pair of diametrically spaced radial lugs (not shown) extending radially inwardly from the tubular member and cooperating in inverted J-grooves 70 (see FIG. 3) formed in the exterior of the body. An O-ring 71 is disposed around the body member at the upper end of the tubular member and forms a liquid-tight seal with the annular member around opening 65 when the body and the tubular member are in their raised position. The lower end of the tubular member defines a circumferential flange 72. A pair of notches 73 are provided in flange 72 at diametrically spaced locations and cooperate with straight ribs 74 raised from housing 26 along the downstream portion of passage 27 to prevent the tubular member from turning in the housing. The rib and notch connection, however, permits reciprocation of the tubular member relative to the housing.

A compression spring 75 is disposed circumferentially of the tubular member and the body between flange 72 and annular member 66. The spring urges the body downwardly relative to the housing.

When water is supplied to head 25, assuming valve member 48 is disposed to permit some degree of water flow through by-pass duct 39, the pressure of the water in the downstream portion of passage 27 is effective upon the tubular member to cause the tubular member to move upwardly against the bias of spring 75 relative to the housing until O-ring 71 seals opening 65 through annular member 66. Normally this occurs when the water pressure in passage portion 38 exceeds about 3 lbs. per square inch. When the body is in its raised position, its outlet opening 62 is raised above the housing and device 34 is operable to discharge water over a surface, such as lawn 13, with which the upper end of the housing is substantially flush-mounted. When the supply of water to the housing is terminated, as by closure of a supply valve in a lawn sprinkling system in which head 25 has been inserted, spring 75 urges the body into its lowered position. In the lowered position of the body, flange 67 seats upon the annular member circumferentially of opening 65 and closes the opening. This occurs prior to complete cessation of water flow through the housing, however, because of the positive bias of spring 75. Accordingly, as the body moves into its retracted position some water flows through opening 65 and flushes the opening so that no dirt particles or the like can become wedged in the opening as the body is retracted.

It has been found that water dispensing devices of the type exemplified by device 34, i.e., in accord with Patent 3,082,961, operate best when the water supplied thereto flows straight toward inlet 61 and does not swirl. Valve 48, however, is so configured that, at least when it is not in either its full-open or full-closed positions, it imparts a swirling motion to water flowing through by-pass outlet opening 42. Such water then flows around and along passage 27 toward device 34. To assure optimum operation of device 34, a baffle plate 80 (see FIG. 3) is mounted in the lower end of tubular member 68 across the bore through the tubular member. Preferably the inlet and outlet openings of the chamber in body 60 are aligned with each other. Baffle 80 is aligned in the tubular member in spaced relation to the body so that it bisects opening 61. The baffle serves to minimize the swirling of water flowing through opening 61.

To illustrate the versatility of this invention, FIG. 7 shows housing 26 fitted with a water dispensing device 85 according to my United States Patent 2,589,942. Device 85 is also of the pop-up type and is externally threaded so as to be engageable in the housing by way of threads 33.

Figure 8:
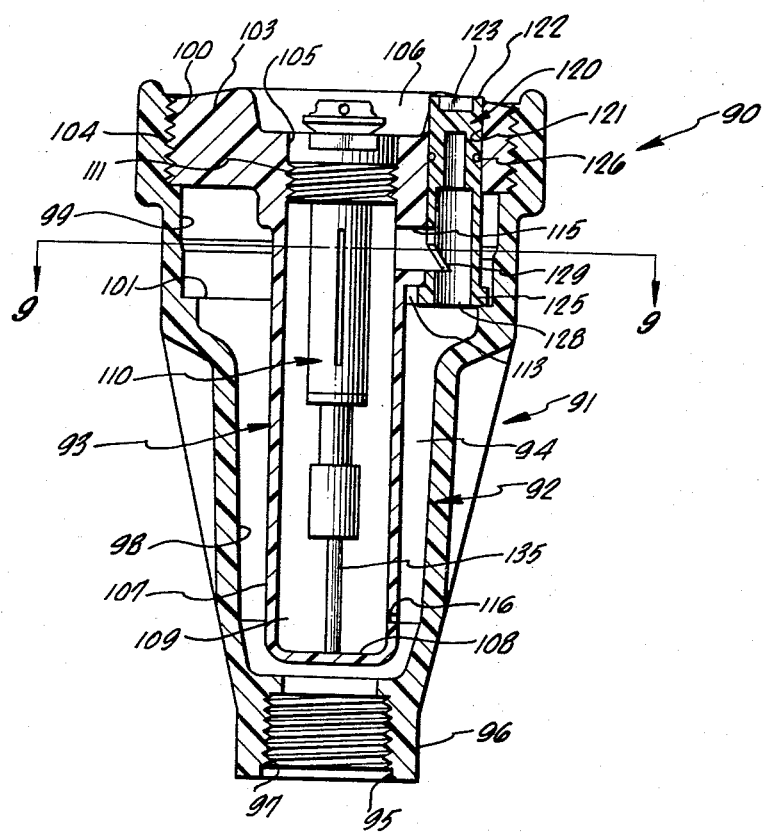
FIG. 8 is a cross-sectional elevation view of another sprinkling head according to this invention.
Figure 9:
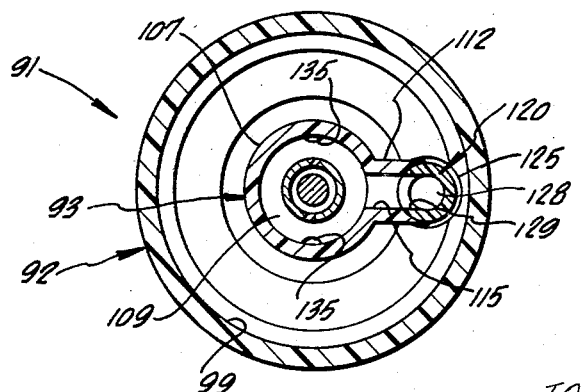
FIG. 9 is a cross-section view taken along line 9—9 in FIG. 8.

FIGS. 8 and 9 show a second sprinkling head 90 according to this invention. Head 90 includes a housing 91 comprised of a first outer part 92 and a second inner part 93. The housing outer part is hollow and defines an inlet portion 94 of a fluid flow passage which extends through the housing. The fluid flow passage has an inlet 95 at a lower end 96 of the outer part of the housing. Adjacent the passage inlet the housing is internally threaded at 97 so that the housing is adapted to be engaged with an externally threaded upper end of a riser pipe connected between a buried water supply pipe and head 90. Above the passage inlet the outer part of the housing defines first and second enlarged diameter portions 98 and 99, respectively, of the passage inlet portion. At its upper end, the outer part of the housing defines an enlarged diameter opening having internal threads 100 about its circumference. The housing outer part defines an upwardly open shoulder 101 circumferentially of enlarged diameter portion 99 adjacent enlarged diameter portion 98.

The housing inner part has an upper end 103 engaged by means of external threads 104 in the threaded opening at the upper end of the housing outer part. The housing inner part is hollow and defines a fluid flow passage outlet opening 105 centrally of an upwardly opening recess 106 in its upper end. The inner part of the housing has a hollow tubular portion 107 which extends from circumferentially of the passage outlet opening to a closed end 108 adjacent the passage inlet and which defines an outlet portion 109 of the fluid flow passage. Between its upper and lower ends, tubular portion 107 is spaced from the interior of the housing outer part.

A water dispensing device 110 is mounted to the inner part of the housing at the passage outlet by threads 111 and extends downwardly into the interior of tubular portion 107. Water dispensing device 110 is according to U.S. Patent 2,854,283, although it will be understood that any suitable water dispensing device may be disposed in housing 91. The dispensing device is operable when water is supplied at a predetermined pressure to it to dispense water over a lawn in which housing 91 is mounted.

Adjacent the upper end of tubular portion 107, the inner part of the housing defines a boss 112 (see FIG. 9) which extends laterally from the tubular portion partially toward the inner wall of housing part 92. The boss has a lower end 113 which is spaced above shoulder 101 when the housing parts are engaged as shown in FIG. 8. An aperture 115 is formed radially through the boss and provides substantially the sole communication between passage inlet and outlet portions 94 and 109, respectively. A small water drain hole 116 is provided through tubular portion 107 adjacent its lower end so that the water may be drained from the interior of the housing inner part in cold weather.

A cylindrical valve member 120 is mounted in the housing inner part and is engaged between the housing inner and outer parts. The valve member passes across aperture 115 and is rotatable in the housing for varying the fluid flow communication between the inlet and outlet portions of the fluid flow passage. The valve member has a circularly cylindrical configuration along the major portion of its length. The upper portion of the valve member is engaged in a circular hole 121 formed through the upper end of housing inner part 93 laterally of, but parallel to, tubular portion 107. The valve member has an upper end 122 which is exposed to the exterior of the housing and which defines a slot recess 123 so that the blade of a screwdriver or the like can be engaged with the valve member for rotating the same to regulate the flow rate of water through the housing. A radial flange 125 extends circumferentially of the lower end of the valve member. The upper surface of the flange is abutted against boss lower end 113 and the lower surface of the flange is abutted against shoulder 101. Accordingly, the valve member is maintained in place when the housing inner and outer parts are threadably engaged with one another in a manner permitting angular movement of the valve member relative to the housing. A fluid tight seal is provided between the valve member and the housing by an O-ring 126 disposed circumferentially of the upper portion of the valve member. An axial recess 128 is formed in the lower portion of the valve member and opens to the inlet portion of the fluid flow passage. An opening 129 is formed through the valve member radially from recess 128 in such a location axially of the valve member that the opening is adapted to register with aperture 115 in boss 112.

Aperture 115 has a substantially rectangular configuration. Opening 129 has a generally rectangular shape the same size as aperture 115; preferably the distance between the vertical edges 130 of the opening is less than one-half the circumference of the valve member. The opening, however, has a triangular extension 131 extending partially around the valve member as shown in FIG. 10. The extension has a maximum height equal to about one-half the elongate extent of the opening; the hypotenuse of the extension preferably lies at an angle of about 45° to the axis of rotation of the valve member. The extension provides a fine control over the flowrate of water through the housing as the valve is first opened or as it approaches its full-closed position. In the full-open position of the valve member, however, a minimum resistance to water flow is provided since the opening and the aperture are fully registered. The valve member has a portion of its circumference which is unapertured equal in extent to the width of aperture 115; this portion of the valve member is registered with aperture 115 when the valve is full-closed so as to completely shut off water flow through the aperture. The valve member is moved angularly from a first position (see FIG. 9) in which the opening and the aperture are registered with one another to a second position in which the opening and its extension are disposed out of registry with the aperture. The degree of fluid flow communication between the inlet and outlet portions of the passage initially is varied linearly but as the opening and aperture move out of registry the variation in aperture closure per degree of valve rotation is decreased. A stop projection 132 is formed in the upper surface of flange 125 for limiting rotation of the valve member in opposite directions by cooperation with the lower extent of boss 112 for assuring that the valve member moves into its first position when rotated in one direction and into its second position when rotated in the other direction.

The valve member also has the characteristic that it is securely engaged with the boss by the water pressure present in the passage inlet portion when the valve is in its second position. As the valve member is rotated, however, to register opening 129 and/or opening extension 131 with aperture 115, the forces holding the valve member in engagement with boss 112 are relieved and the valve member is automatically "freed" so that a reduced amount of torque is required to operate the flow regulator of which the valve member is a component.

Those skilled in the art will recognize that water dispensing device 34, shown in FIG. 1, can be installed into housing 91 if desired. To this end, a pair of vertical guide ribs 135 are molded into the inner walls of tubular portion 107 at diametrically opposed locations (see FIG. 9). These ribs are similar to ribs 74, shown in FIG. 1, and assure that the dispensing device 34, when installed in housing 91, will not rotate angularly relative to the housing.

As noted above, housings 26 and 91 are connectable to the riser ducts of an underground lawn sprinkling system. The water discharge rate from the several heads in the system can be adjusted by operating flow regulating valves 48. These valves are accessible from above the ground without removing the water dispensing devices from the housings. The regulating valves, because of the configurations described above, provide a minimum head loses (pressure drop) to water flowing through the heads when the valves are in their full-open positions.

Preferably the components of the heads described above are fabricated from a hard plastic such as polyvinylchloride, polypropylene, acrylonitrile-butadiene-styrene (ABS resins) or acetal resins derived by polymerization of formaldehyde.

While the invention has been described above in conjunction with specific apparatus and configurations thereof, this has been by way of example only in aid of explaining presently preferred embodiments of the invention and should not be considered as limitations on the scope of this invention.

What is claimed is:

1. Apparatus for use in dispensing liquid over a surface comprising a housing having a liquid flow passage through the interior thereof, the passage having an inlet end and an outlet end, a liquid dispensing device mounted in the passage at the outlet end thereof for dispensing liquid over the surface, means in the housing between the inlet and outlet ends of the passage effective upon all liquid emerging from the housing for regulating the flow of liquid through the passage to the dispensing device, the flow regulating means including a septum across the passage between the passage inlet end and the dispensing device and having an opening therein through which passes all the liquid emerging from the housing and a unitary movable member rotatably mounted in the housing cooperating with the opening and extending from the opening to an end exposed to the exterior of the housing adjacent to and laterally of the outlet end of the passage, means securing the movable member from movement relative to the housing along its axis of rotation, and means at the exposed end of the movable member operable with the dispensing device in place in the housing for rotating the member to vary the area of the opening available for the flow of liquid therethrough.

2. Apparatus according to claim 1 wherein the member and the housing contiguous to the opening are cooperatively configured and arranged so that the available liquid flow area of the opening is varied between a maximum area and a minimum area as the member is indexed angularly relative to the housing.

3. Apparatus according to claim 2 wherein the dispensing device is of the class wherein an element thereof rises above the upper end of the housing when liquid is supplied under pressure to the device.

4. Apparatus according to claim 3 wherein the dispensing device element comprises a hollow body having upper and lower ends and an inside chamber having a longitudinal axis, the lower end of the body having an inlet opening to the housing fluid flow passage eccentric of the longitudinal axis of the inside chamber, the body having an outlet opening from said chamber larger in size than said inlet opening and spaced between the said ends of the hollow body, the element rising relative to the upper end of the housing when liquid is supplied thereto a distance sufficient to place the outlet opening from said inside chamber above the upper end of the housing, and means cooperating between the hollow body and the housing for maintaining the hollow body in a selected angular relation to the septum opening.

5. Apparatus for use in dispensing liquid over a surface comprising a housing having a liquid flow passage through the interior thereof, the passage having an inlet end and an outlet end, a liquid dispensing device mounted in the passage at the outlet end thereof for dispensing liquid over the surface, the dispensing device being of the class wherein an element thereof rises above the upper end of the housing when liquid is supplied under pressure to the device, means in the housing for regulating the flow of liquid through the passage to the dispensing device, the flow regulating device including a septum across the passage and having an opening therein and a unitary movable member rotatably mounted in the housing cooperating with the opening and extending from the opening to an end exposed to the exterior of the housing adjacent the outlet end of the passage, means at the exposed end of the movable member operable with the dispensing device in place in the housing for rotating the member to vary the area of the opening available for the flow of liquid therethrough, the risable element of the dispensing device comprising a hollow body having upper and lower ends and an inside chamber having a longitudinal axis, the lower end of the hollow body having an inlet opening to the inside chamber from the housing fluid flow passage eccentric of the longitudinal axis of the inside chamber, the body having an outlet opening from the inside chamber larger in size than said inlet opening and spaced between said ends of the hollow body, the element rising relative to the upper end of the housing when liquid is supplied thereto a distance sufficient to place the outlet opening from the chamber above the upper end of the housing, and baffle means in the passage between the septum opening and the inlet opening to said inside chamber for assuring that water flowing to said inlet opening flows straight through said inlet opening and along the chamber to the chamber outlet opening.

6. Apparatus according to claim 5 wherein the chamber inlet opening and the septum opening are aligned with each other along the passage, and the baffle means comprises a planar member aligned with the septum and chamber inlet openings.

7. Apparatus according to claim 5 including means cooperating between the hollow body and the housing for maintaining alignment of the chamber inlet opening with the septum opening.

8. Apparatus according to claim 5 including means operatively engaged between the hollow body and the housing for urging the hollow body into a retracted position thereof relative to the housing.

9. Apparatus according to claim 5 including means cooperating between the hollow body and the housing for effecting a fluid tight seal between the body and the housing in a raised position of the body relative to the housing.

10. A lawn sprinkling head for mounting in a lawn comprising a hollow housing having a fluid flow passage therethrough from end to end of the housing, the housing being adapted to be mounted with one end thereof substantially flush with the surface of a lawn with its other end disposed in the ground, a fluid dispensing device mounted in the passage at the one end of the housing and operative when fluid is supplied thereto to dispense fluid over the lawn, and means in the housing for regulating the flow of fluid to the dispensing device including a septum across the passage, a by-pass duct around the septum communicating the passage on one side of the septum with the passage on the other side of the septum and through which passes all fluid emerging from the housing, a rotatable valve member having one end disposed in the by-pass duct and an exposed opposite end at the one end of the housing adjacent to and laterally of the opening of the passage to the one end of the housing, the by-pass duct and the valve member being cooperatively configured and arranged so that rotation of the valve member in the duct varies the communication of the passage portions on opposite sides of the septum with one another, and means securing the valve member from all movement but angular movement relative to the housing.

11. A lawn sprinkling head for mounting in a lawn comprising a hollow housing having a fluid flow passage therethrough from end to end of the housing, the housing being adapted to be mounted with one end thereof substantially flush with the surface of a lawn with its other end disposed in the ground, a fluid dispensing device mounted in the passage at the one end of the housing and operative when fluid is supplied thereto to dispense fluid over the lawn, and means in the housing for regulating the flow of fluid to the dispensing device including a septum across the passage, a by-pass duct around the septum communicating the passage on one side of the septum with the passage on the other side of the septum, the by-pass duct having a circularly cylindrical portion and outlet therefrom radially to the passage between the septum and the only end of the housing, the duct outlet opening being elongated in the direction of fluid flow through the duct, a valve member having one end disposed in the by-pass duct and an exposed opposite end at the one end of the housing adjacent the opening of the passage to the one end of the housing, the valve member being mounted in the housing for rotation about an axis coaxial with said portion of the by-pass duct, the valve member having a cylindrical plug portion in said duct portion opposite the duct outlet opening, the plug portion having a length from the one end of the valve member at least equal to the length of the duct outlet opening, the plug portion being segmentally relieved along its length opposite the opening, the amount of segmental relief of the plug varying linearly along the plug, the plug portion having a concave surface opening to an imaginary plane defined by the chords beyond which the plug is relieved.

12. A lawn sprinkler head adapted to be mounted in the ground with its upper end substantially flush with the ground and to be supplied with water from a buried water pipe comprising a hollow housing having a fluid flow passage therethrough from an inlet to an outlet at the upper end of the housing, a water dispensing device mounted in the passage at the one end of the housing for dispensing water radially from the housing, and means in the housing for regulating the flow of water to the dispensing device including a septum across the passage, a cylindrical by-pass duct around the septum communicating the passage on one side of the septum with the passage on the other side of the septum, and a valve member rotatably mounted in the housing coaxially of the by-pass duct and having a cylindrical valve plug at one end thereof disposed in the by-pass duct and an exposed opposite end at the upper end of the housing adjacent the passage outlet, the by-pass duct having an opening radially therefrom to the passage between the septum and the passage outlet, the one end of the plug being disposed upstream of the by-pass outlet opening, the opening being elongated and positioned within the axial extent of the valve plug, the valve plug from the one end of the plug to opposite the downstream end of the by-pass outlet being segmentally relieved relative to an imaginary plane oblique to the axis of rotation of the valve member, the plug defining a concave surface opening to the imaginary plane substantially along the extent of the relief, the plug being operable upon rotation of the valve member to vary the communication between the by-pass duct and the passage through the by-pass outlet.

13. A lawn sprinkler head adapted to be mounted in the ground with its upper end substantially flush with the ground and to be supplied with water from a water pipe buried in the ground comprising a hollow housing having a fluid flow passage therethrough from an inlet to an outlet at the upper end of the housing, the housing including a hollow first part defining the passage inlet at a lower end thereof and a passage inlet portion, the housing first part having an enlarged diameter opening at its upper end to which the passage inlet portion opens, a housing second part engaged in the enlarged diameter opening of the housing first part and defining the passage outlet at its upper end, the housing second part having a hollow tubular portion extending in spaced relation to the interior of the housing first part from circumferentially of the passage outlet to a closed end adjacent the passage inlet and defining a passage outlet portion, an aperture through the tubular portion adjacent the upper end of the housing first part defining substantially the sole communication between the passage inlet and outlet portions, a cylindrical valve member rotatably mounted in the upper end of the housing second part adjacent said aperture and extending from an upper end exposed to the exterior of the housing adjacent the passage outlet to a lower end in the passage inlet portion below said aperture, and a water dispensing device mounted in the housing second part at the passage outlet for dispensing water radially from the housing over the ground, the valve member being slidably engaged with the exterior of the housing second part about the aperture and defining an axial recess open to the lower end of the valve member and the passage inlet portion and an opening radially therethrough from the recess, the opening being positioned along the valve member so that the opening registers with the aperture when the valve member is disposed in a first angular position and the passage inlet and outlet portions are in fluid flow communication through the opening and the aperture, the valve member having a second angular position in which the opening is out of registration with the aperture and the passage inlet and outlet portions are out of fluid flow communication through the aperture.

14. A lawn sprinkler head adapted to be mounted in the ground with its upper end substantially flush with the ground and to be supplied with water from a water pipe buried in the ground comprising a hollow housing having a fluid flow passage therethrough from an inlet to an outlet at the upper end of the housing, the housing including a hollow first part defining the passage inlet at a lower end thereof and a passage inlet portion, the housing first part having an open end to which the passage inlet portion opens, a housing second part engaged in the upper end of the housing first part and defining the passage outlet at its upper end, the housing second part having a hollow tubular portion extending in spaced relation to the interior of the housing first part from circumferentially of the passage outlet to a closed end adjacent the passage inlet and defining a passage outlet portion, an aperture through the tubular portion adjacent the upper end of the housing first part defining substantially the sole communication between the passage inlet and outlet portions, a cylindrical valve member rotatably mounted in the upper end of the housing second part adjacent said aperture and extending across the aperture from an upper end exposed to the exterior of the housing adjacent the passage outlet to a lower end in the passage inlet portion below said aperture, the valve member being angularly movable for varying the fluid flow communication between the passage inlet and outlet portions through the aperture, and a water dispensing device mounted in the housing second part at the passage outlet for dispensing water radially from the housing over the ground.

References Cited

UNITED STATES PATENTS

| | | | |
|---|---|---|---|
| 1,776,455 | 9/1930 | Thompson | 239—582 X |
| 2,086,281 | 7/1937 | Nelson et al. | 239—204 X |
| 2,253,979 | 8/1941 | De Lacey-Mulhall | 239—206 |
| 2,509,076 | 5/1950 | Royer | 239—206 X |
| 2,546,574 | 3/1951 | Wilcox | 239—204 X |
| 2,573,786 | 11/1951 | Brodbeck et al. | 239—204 X |
| 3,082,961 | 3/1963 | Hruby | 239—598 |
| 3,263,930 | 8/1966 | Friedmann et al. | 239—206 |
| 3,282,508 | 11/1966 | Roberts | 239—204 |

M. HENSON WOOD, Jr., *Primary Examiner.*

VAN C. WILKS, *Assistant Examiner.*

UNITED STATES PATENT OFFICE
CERTIFICATE OF CORRECTION

Patent No. 3,323,725                                      June 6, 1967

John O. Hruby, Jr.

It is hereby certified that error appears in the above numbered patent requiring correction and that the said Letters Patent should read as corrected below.

In the heading to the drawings, sheets 1 to 3, line 2, for "SPINKLER" read -- SPRINKLER --; column 3, line 69, for "cooperative" read -- cooperate --; column 7, line 9, strike out "the"; line 20, for "loses" read -- loss --; column 8, lines 36 and 37, for "sufficlent" read -- sufficient --; column 8, line 60, for "a" read -- the --; column 9, line 28, for "only" read -- one --.

Signed and sealed this 18th day of June 1968.

(SEAL)
Attest:

Edward M. Fletcher, Jr.                                          EDWARD J. BRENNER Attesting Officer                                                  Commissioner of Patents